United States Patent [19]
Maitland

[11] Patent Number: 5,985,155
[45] Date of Patent: Nov. 16, 1999

[54] METHOD AND APPARATUS FOR AUTOMATIC ADJUSTMENT OF HALOGEN PRODUCTION IN A WATER TREATMENT SYSTEM

[75] Inventor: Peter Maitland, Fort Lauderdale, Fla.

[73] Assignee: Autopilot Systems, Inc., Ft. Lauderdale, Fla.

[21] Appl. No.: 08/970,936

[22] Filed: Nov. 14, 1997

[51] Int. Cl.⁶ .................... C02F 1/00; C02F 1/72; G05B 11/00; A61L 2/16
[52] U.S. Cl. ............. 210/739; 137/2; 137/624.15; 204/229; 205/744; 210/87; 210/96.1; 210/139; 210/149; 210/169; 210/198.1; 210/742; 210/743; 210/754; 210/756; 422/3; 422/105
[58] Field of Search ................ 210/85, 87, 96.1, 210/139, 143, 149, 169, 198.1, 199, 206, 243, 258, 739, 742, 743, 752, 753, 754, 756, 764, 765, 766; 422/3, 28, 29, 37, 105, 108; 204/228, 229, 237; 137/5, 88, 93; 205/744, 148

[56] References Cited

U.S. PATENT DOCUMENTS

| | | |
|---|---|---|
| 3,468,809 | 9/1969 | Bloom .................. 137/624.15 |
| 3,763,878 | 10/1973 | Harden ................. 137/624.15 |
| 4,100,052 | 7/1978 | Stillman . |
| 4,224,154 | 9/1980 | Steininger ................... 210/85 |
| 4,657,670 | 4/1987 | Newton ................... 210/96.1 |
| 5,422,014 | 6/1995 | Allen et al. ............... 210/743 |
| 5,792,343 | 8/1998 | Fujita et al. ............. 210/139 |

Primary Examiner—Joseph W. Drodge
Attorney, Agent, or Firm—Clifford A. Poff

[57] ABSTRACT

A method and apparatus for automatically adjusting electrolytic production or feeding of a sanitizer such as halogen for treating a water body such as a swimming pool or spa. A microprocessor is responsive to sensors monitoring pH and temperature of the water body to predict demand for sanitizer which varies dependent on pH and temperature and direct a controller which automatically modifies the ON time during an ON/OFF cycle for the sanitizer production system in response to changing demand resulting from changing measurements in temperature and/or pH of the swimming pool water. The controller also modifies an ON/OFF cycle for a circulating pump when demand predicted by the microprocessor exceeds the capability of the sanitizer producer or feeder under an existing ON/OFF pump cycle.

17 Claims, 4 Drawing Sheets

METHOD AND APPARATUS FOR AUTOMATIC ADJUSTMENT OF HALOGEN PRODUCTION IN A WATER TREATMENT SYSTEM

BACKGROUND OF THE INVENTION

1. Field of the Invention

The present invention relates generally to the electrolytic generation of a halogen, such as chlorine, for treating algae and bacteria within a water source, such as a swimming pool or spa. More particularly, the present invention relates to an improved system of controlling the production of the halogen through automatic adjustment in the production rate in response to changing demand.

2. Description of the Prior Art

The use of halogen, particularly chlorine, to treat algae and bacteria in water systems such as swimming pools and spas, is well known. A commonly used procedure involves the manual introduction of chemicals into the swimming pool. This method is too labor intensive in that it requires frequent testing of the water to determine chlorine demand in addition to the time that is required for the handling, storing and application of the chemicals. Safety issues are raised by the need for storage and handling of the potentially hazardous chemicals.

Other techniques involved electrolysis thereby avoiding the need for manual introduction of chemicals. One technique involving the use of a brine for generating chlorine gas and/or sodium hypochlorite is disclosed in U.S. Pat. No. 4,693,806 to Tucker and U.S. Pat. No. 5,037,519 to Wiscombe. An alternative is to use an electrolytic cell to produce a halogen, such as chlorine in the form of sodium hypochlorite, by passing water carrying the salt of the desired halogen, such as sodium chloride where chlorination is desired, through the cell. Such a system is disclosed in U.S. Pat. No. 4,100,052 to Stillman.

The electrolytic systems of the prior art typically utilize a fixed current power supply to generate chlorine with the amount of chlorine being produced controlled by varying the amount of time that the chlorination system is operating. The cycle time for the chlorination system will be set by a user of the system based on an estimation of the sanitization needs for the system. However, such a system will not respond to changes in the demand for sanitizer which may occur subsequently to the initial setting of the cycle time unless the cycle time is changed by a user of the system. The weakness in such systems is that under changing conditions, including temperature and pH of the water, the system will not be providing the appropriate level of chlorination at the time when it is needed. What is needed is a system which automatically responds to changing conditions to allow for instant modification of the rate of production of the sanitizer thereby more optimally matching sanitizer production with sanitizer demand. This will insure that sanitizing is adequate when the demand is high because of high water temperatures and resulting high bath load and there will not be overproduction when demand is low.

Therefore, it is an object of the present invention to provide a control system for the production of sanitizer within a water treatment system which automatically adjusts the rate of halogen production in response to changes in water conditions, including temperature or pH level.

It is a further object of the present invention to provide a sanitizing control system operable according to a preset program developed to respond to sanitizer consumption according to a programmed response parameter such as temperature or pH and with a feed back control loop to adjust sanitizer production when the programmed parameter differs from the predicted production requirements.

SUMMARY OF THE INVENTION

According to the present invention, there is provided a method and apparatus for automatically adjusting the rate of production of a sanitizing agent such as halogen within a water treatment system for treating algae and bacteria within a water source. The system includes halogen producer or feeder means operably connected to a water source for introducing a sanitizing agent into such a water source. The system further includes a pump to receive water from the water source for forming a treatable water flow to receive a sanitizer supply from the halogen producer or sanitizer feeder. A sensor in contact with water of the water source for monitoring parameters of the water source such as temperature or pH. The system also includes controller operatively coupled to the feeder/producer and the sensor for providing an initial manually adjusted ON/OFF cycle for the halogen production/feeder means as well as for automatically modifying the ON/OFF cycle in response to variation in demand for the sanitizer resulting from changes in the monitored parameters. Also the controller is able to extend the operating time of the system if necessary to meet a demand for sanitizer in excess of the initial setting.

BRIEF DESCRIPTION OF THE DRAWINGS

The present invention will be more fully understood when the following description is read in light of the accompanying drawings in which.

DETAILED DESCRIPTION OF THE PREFERRED EMBODIMENTS

Figure 1:
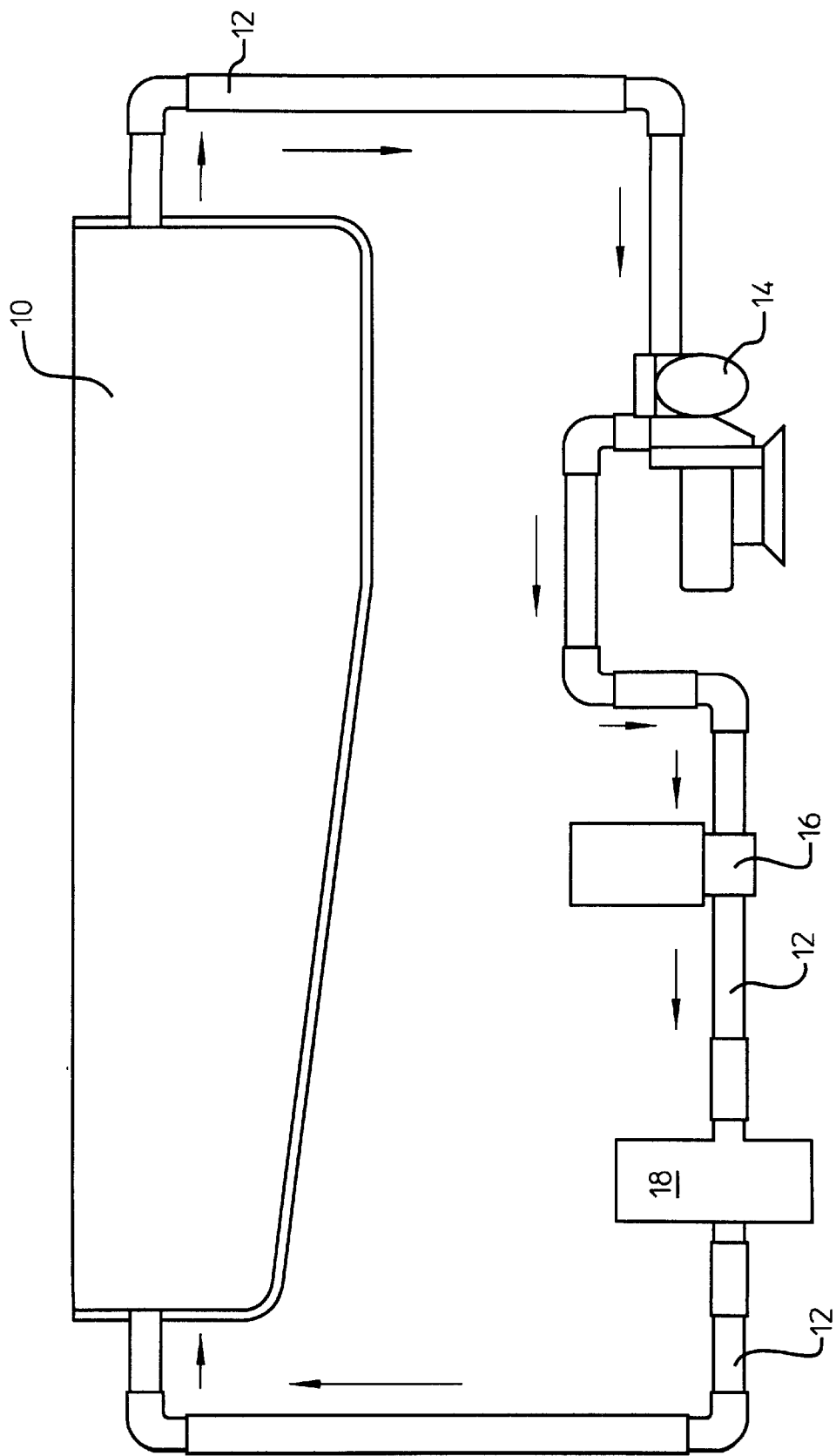
FIG. 1 is a schematic layout showing a typical swimming pool incorporating a sanitizer production system according to the present invention.

Referring to FIG. 1, a schematic of a water treatment system according to the present invention is shown. The schematic shows a typical swimming pool 10. The water is circulated through the pipe 12 by pump 14. The system also includes a filter 16 to remove debris which may have been introduced into the swimming pool. The pump and filter are typical pool equipment commonly found in swimming pool and spa systems. A treatable water supply flows in pipe 12 through the sanitizer production system 18 to introduce a sanitizer into the water. The water is then redirected back to the swimming pool 10 where the sanitizer will act on bacteria and algae in the swimming pool.

Figure 2:
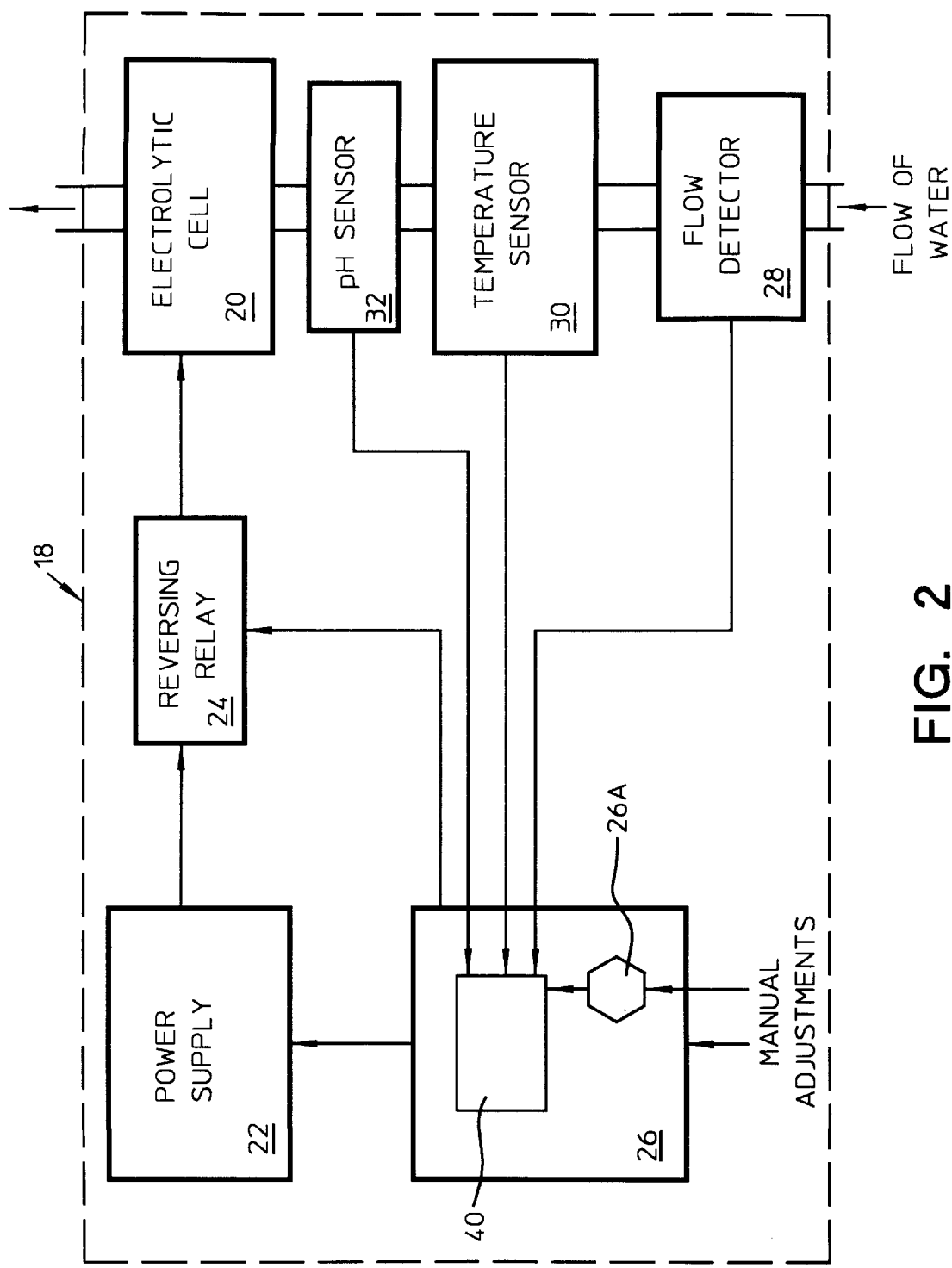
FIG. 2 is a schematic of a sanitizer production system of FIG. 1 which uses an electrolytic cell for producing chlorine in the form of sodium hypochlorite.

Turning to FIG. 2, a schematic of a first embodiment of the sanitizer production system on a typical body of water such as a swimming pool or spa of FIG. 1 is shown. The sanitizer produced by the production system of FIG. 2 is most commonly chlorine, and is generated by an electrolytic cell 20. In such a case, the swimming pool or spa will have added to it a relatively small amount of sodium chloride or other halogen salt. It has been found that a one time addition of approximately 400 pounds of sodium chloride to a swimming pool containing 20,000 gallons of water will serve as the source for chlorine for an entire season because the chlorine is reconverted to sodium chloride in the process of the water treatment cycle as will be discussed in greater detail. Although chlorine is the most common form of halogen for the halogen production system of FIG. 2, an alternative form of electrolytic cell could use a different halogen such as bromine wherein the salt added to the water would be sodium bromide. The electrolytic cell 20, per se well known in the art, is available as a separate component for example by Autopilot Systems, Inc., of Fort Lauderdale, Fla., as Lectranator® Models SRT-200–360, 600 or 840. Such cells include spaced apart plates through which an electric current is passed to power the chemical conversion of the sodium chloride into chlorine in the form of sodium hypochlorite. Such cells are supplied with a fixed current density, such current being supplied to the cell of FIG. 2 from power supply 22. The rate of chlorine production is generally controlled by variation in the amount of time that the cell is receiving current, which will be referred to as the ON/OFF ratio or ON/OFF cycle of the electrolytic cell. It is important to note, and an essential feature of the present invention, that the amount of chlorine that is produced by an electrolytic cell also depends on other variables, in addition to ON/OFF ratio, including temperature of the water source.

Over time, the plates of electrolytic cells will become corroded with scale. The sanitizer production system of FIG. 2 may include a reversing relay 24 which allows for periodic reversal in the direction of the flow of current through the plates of cell 20 which serves to remove scale deposits which may have formed.

A controller 26 controls the operation of the electrolytic cell 20 by sending a control signal to the power supply 22 to turn the power supply current delivered to the electrolytic cell ON and OFF. In general the amount of chlorine produced by the chlorination system will be proportional to the ON/OFF cycle for the chlorination production system because the magnitude of the current produced by the power supply will be constant. The ON/OFF ratio of the power supply is initially set by manual adjustment of the controller which may include the setting of the ON time period using a clock 26A to provide a timer signal to the controller.

In this example the halogen production system also includes sensors which monitor the flow stream to the electrolytic cell 20 and provide information to the controller 26. Such sensors include a flow detector 28 which is included to ensure that the power supply will be turned OFF to the cell when there is no water flow. The system may also include a salinity sensor, which in a fashion similar to the flow detector will ensure that the power supply will be turned OFF when there is insufficient salt present in the flow stream for the production of chlorine by the electrolytic cell. The system of the present invention also includes a temperature sensor 30 and an optional pH sensor 32 which measures the acidity or alkalinity of the flow stream, sensors 30 and 32 being used by a microprocessor 40 forming part of a feed back control loop to automatically override the manual settings and modify either by increasing or by decreasing the production of chlorine in response to changing demands for chlorine as derived by signals from temperature 30 or pH sensor 32. Software of a microcontroller incorporated in the microprocessor is programmed for defining one or more mathematical expressions that define corresponding relationships depicted by the curves in FIGS. 4–6. It is sufficient for the present invention that the programming consists of one mathematical expression defining one of the curves found in FIGS. 4–6. The microprocessor 40 also includes an algorithm which functions to form an overriding control signal. For this purpose, as shown in FIG. 2, the microprocessor 40 which is part of the controller 26 receives input signals from the clock 26A and any one or a plurality of signals from the flow detector 28, temperature sensor 30 and the pH sensor 32. The output by the microprocessor is used by the controller to over ride the control established by the manual adjustments so as to reestablish the desired chlorine concentration in the pool water.

Figure 3:
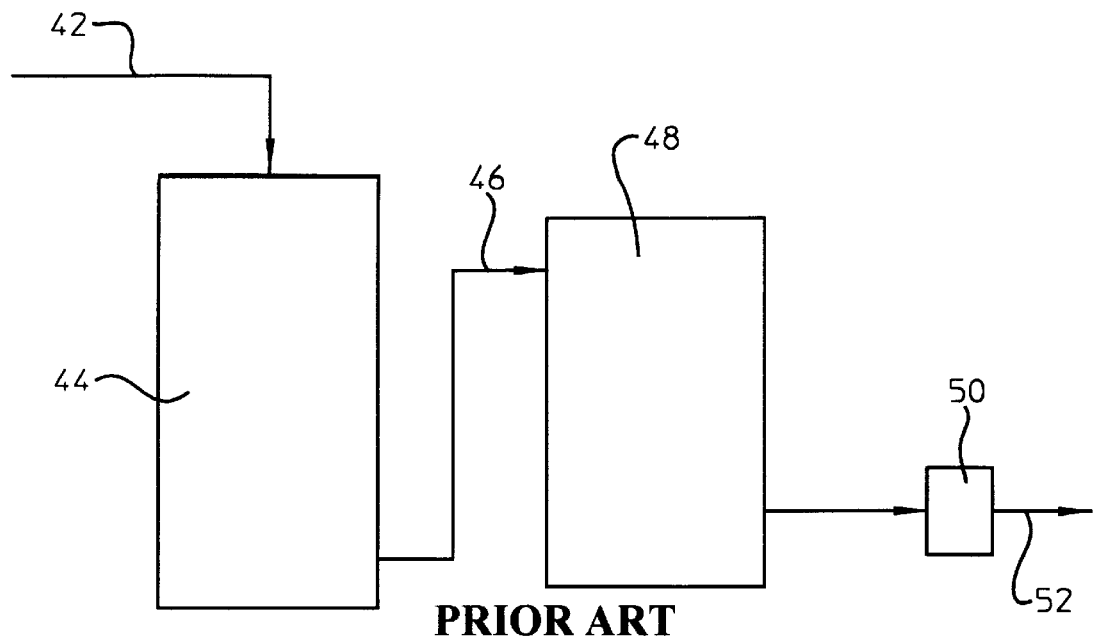
FIG. 3 is a schematic of a halogen production system of FIG. 1 which uses a brine for producing chlorine in the form of chlorine gas and/or sodium hypochlorite.

As an alternative to generating halogen using the electrolytic cell system of FIG. 2, the water treatment system according to the present invention includes a sanitizer feeder or generating system seen in FIG. 3. This system utilizes a brine solution to generate chlorine in the form of chlorine gas and/or sodium hypochlorite, as disclosed in U.S. Pat. No. 4,693,806 to Tucker. To form the brine, pool water is fed by a line 42 which is a branch line diverting a partial flow of pool water from pipe 12 downstream of pump 14. Water is received in a chlorine solution generator 44 wherein chlorine gas is produced electrolytically from a salt solution to generate chlorine gas which is absorbed into a partial flow of pool water in a mixing tube 46 that empties into a holding chamber 48. From chamber 48 chlorine solution is metered by a valve 50 in line 52 into the pool water. The controller 26 provides its output signal for use as the control parameter for selecting the flow rate of chlorine solution to the pool according the present invention.

Figure 4:
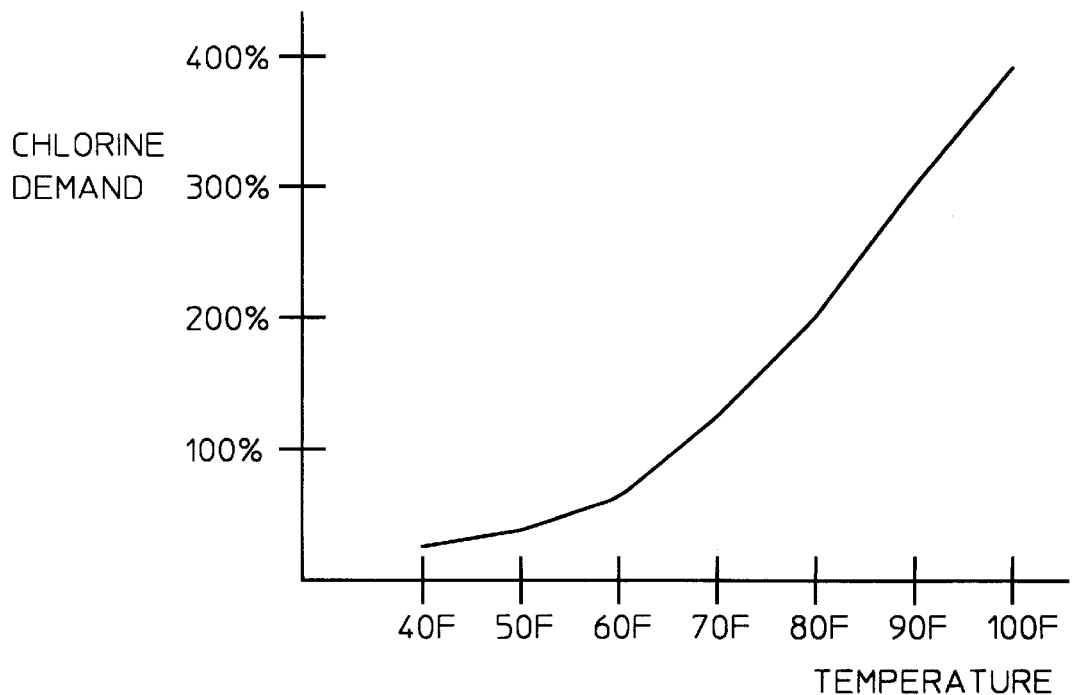
FIG. 4 is a graphical representation of the relationship between the temperature of a water body and the sanitizer demand for such a water body.

Turning to FIG. 4, the curve shows that the demand for sanitizer in a water body will vary based upon changes in the temperature of the water body. Increases in sanitizer demand with increases in temperature are based on factors including increase in dissipation of sanitizer, increase in growth rate of algae, and increase in the number of anticipated swimmers in the case of a swimming pool or spa, also known as the bather load. The chlorine demand is represented by scaler factors, for purposes of illustration, since the actual amount of sanitizer requirements will vary among differing swimming pools. The dramatic effect that temperature has on the demand for chlorine is evident when one notes that the demand increases from the arbitrarily assigned 100 percent corresponding to approximately 67 degrees Fahrenheit by a factor of 3 at a temperature of approximately 90 degrees Fahrenheit. The curve also indicates that below approximately 58 degrees Fahrenheit, there is a much lower sanitizer demand as compared to temperatures above 58 degrees Fahrenheit. As the temperature decreases, the ON time for the cell is decreased. The minimum ON time is reached at a temperature of 58 degrees Fahrenheit at which temperature the power supply to the electrolytic cell is turned ON by the control system for only a few minutes in every 24 hour period. The chlorine production by operation of the electrolytic cell will be at a reduced production rate below 58 degrees, and the system of the present invention may, if desired, halt the production of chlorine by the cell when the temperature of the water source drops below 58 degrees Fahrenheit selected arbitrarily as a threshold.

Figure 5:
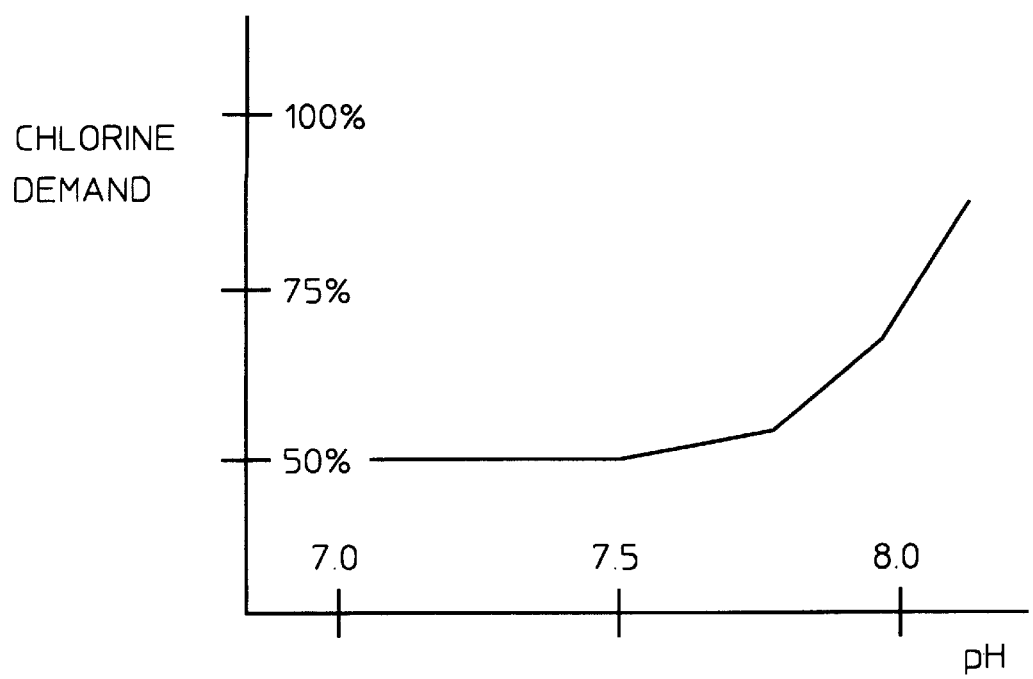
FIG. 5 is a graphical representation of the relationship between the pH measurement of a water body and the sanitizer demand for such a water body.

The demand for sanitizer also varies depending on the pH of the water source as seen in the curve of FIG. 5. The curve shows that for pH below approximately 7.5 the sanitizer demand remains constant. However as the pH increases above 7.5, the demand for sanitizer begins to increase and increases dramatically as the pH approaches approximately 8.0.

The system of the present invention utilizes changes in the measured temperature and may also utilize changes in pH of the water source to optimize the amount of sanitizer that is produced or fed in the following manner. An operator initially sets the manual adjustment of the controller 26 to provide for a certain ON/OFF ratio necessary to produce the desired amount of sanitizer. Such an estimate of sanitizer demand will be based on the demand necessary given the starting point values of temperature and pH existing when the controller 26 is set. The microprocessor 40 adjusts the controller 26 to vary the ON/OFF ratio from that which was initially set manually by a user of the system when changes occur in the measured temperature or pH from the values in existence when the ON/OFF ratio was initially set. The microprocessor will utilize the relationship of sanitizer demand to temperature and pH, as seen in FIGS. 4 and 5, to optimize the sanitizer production under the changing conditions.

Figure 6:
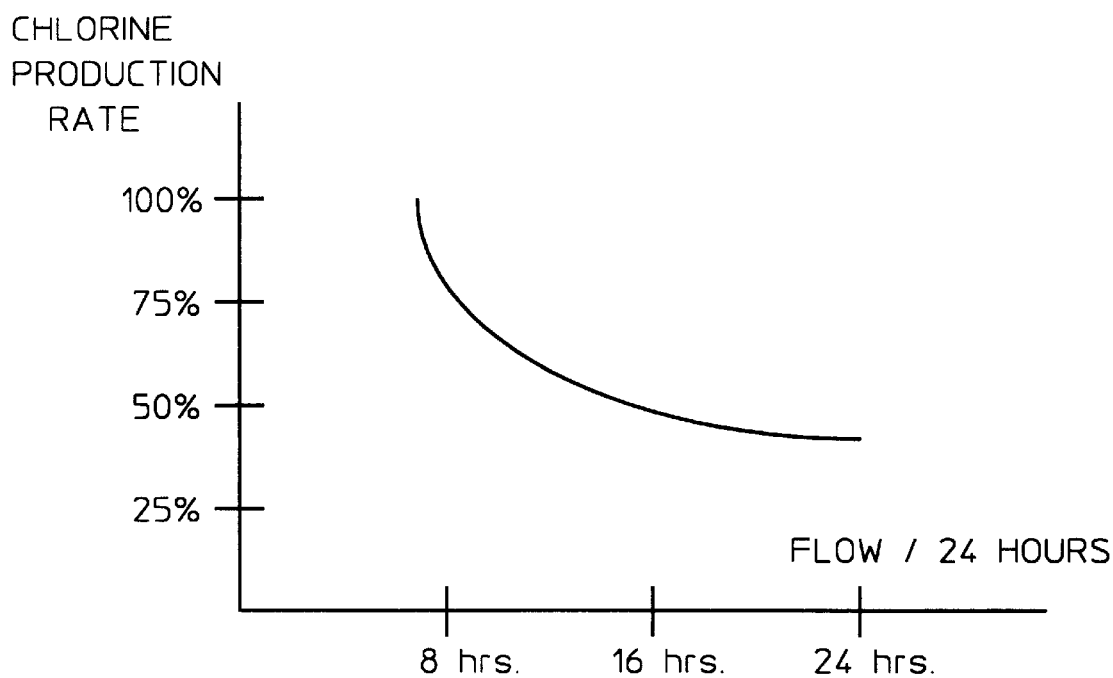
FIG. 6 is a graphical representation of the relationship between the required sanitizer production rate to produce a given amount of chlorine and the ON/OFF ratio of the pump of the circulation system of the water source providing the flow to the chlorination system.

In addition to the automatic control over the sanitizer production rate in response to changes in the temperature and pH of the water source, the present invention can include adjustment over the operation of the pump 14 where the microprocessor 40 determines that the maximum capacity of the sanitizer production system will be insufficient to meet expected demand under an existing pump ON/OFF cycle. Turning to FIG. 6, the curve shows the relationship between the sanitizer production rate required to produce a certain amount of chlorine and the number of hours within a 24 hour period the pump, and therefore the sanitizer production system, is operating. Obviously, the greater the number of hours within a 24 hour period that the pump, and therefore the sanitizer system, is in operation, the fewer will be the number of hours within the pump ON times that the sanitizer system will need to be operating. For example, let it be assumed that a 100 percent pump cycle is established at 8 hours per 24 hour level, and let it be assumed that the operation of the microprocessor establishes that an insufficient amount of sanitizer will be produced at the ON/OFF sanitizing cycle. When these assumptions occur, the microprocessor outputs a control signal causing the pump cycle time to be increased to the 16 hour/24 hour level indicated on the curve. This would increase the potential sanitizer production by a factor of two or three over a 24 hour period.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims. For example, this invention may be used to operate a chemical feeder by adjusting the ON/OFF time of the feeder and the ON time of the circulation system.

I claim:

1. A method for treating a water body including the steps of:
    (a) providing a sanitizer producer for introducing a sanitizer into such a water body;
    (b) providing a pump for creating a flow between said sanitizer producer and such a water body;
    (c) providing a control means for control over ON/OFF time for said sanitizer
    (d) providing a sensor for monitoring parameters of such a water body;
    (e) establishing an initial ON/OFF cycle for the sanitizer producer based upon a predicted demand for sanitizer under an initial set of parameters existing in such a water source; and
    (f) modifying the ON/OFF cycle for the sanitizer producer automatically based upon changes in said monitored parameters from said initial set of parameters.

2. The method according to claim 1 wherein the water body is a swimming pool or spa.

3. The method according to claim 1 including the further step of adding sodium chloride and/or sodium bromide to the water body and wherein the controllable source of sanitizer includes an electrolytic cell for production of sanitizer by converting the added sodium chloride and/or sodium bromide into sodium hypochlorite or sodium hypobromite.

4. The method according to claim 3, wherein a controller controls the ON time of the electrolytic cell by controlling the current sent to the cell and wherein the controller further includes a microprocessor which is responsive to changes in said at least one parameter to determine corresponding changes in the sanitizer demand.

5. The method according to claim 4 wherein the at least one parameter includes temperature of the water body.

6. The method according to claim 4, wherein the at least one parameter includes pH of the water body.

7. The method according to claim 1, wherein a pump having an ON/OFF cycle creates a flow between the controllable source of sanitizer and the water body and wherein the method includes the further step of controlling the ON/OFF cycle for the pump when the demand for sanitizer exceeds the capability of the controllable source of sanitizer under an existing ON/OFF pump cycle.

8. A system for treating a water body including:
    (a) a controllable source of sanitizer;
    (b) a pump operably connecting said controllable source of sanitizer to the water body for creating a flow of water therebetween;
    (c) at least one sensor in contact with the water body, the sensor monitoring at least one parameter of the water body on which a demand for sanitizer in the water body depends; and
    (d) a controller operably connected to the controllable source of sanitizer and the at least one sensor, the controller establishing a predicted demand for sanitizer within an ON/OFF cycle for the source of sanitizer corresponding to the at least one parameter and establishing an ON time for the source of sanitizer based on the predicted demand, the controller further automatically modifying the ON/OFF cycle for the source of sanitizer by increasing or decreasing the ON time based on changes in the predicted demand resulting from changes in the at least one parameter.

9. The system according to claim 8, wherein the water body is a swimming pool or spa.

10. The system according to claim 9 in which the sanitizer is a halogen.

11. The system according to claim 8, wherein the controllable source of sanitizer includes an electrolytic cell and wherein the water body has had added to it an amount of sodium chloride and/or sodium bromide for conversion into sodium hypochlorite or sodium hypobromite by the electrolytic cell.

12. The system according to claim 4, wherein the controller controls an ON/OFF cycle of the electrolytic cell by controlling current sent to the cell and wherein the controller further includes a microprocessor.

13. The system according to claim 12, wherein the at least one parameter includes temperature of the water body.

14. The system according to claim 12, wherein the at least one parameter includes pH of the water body.

15. The system according to claim 8, wherein the controller is operably connected to the pump such that an ON/OFF cycle for the pump can be increased when the predicted demand for sanitizer exceeds the capability of the controllable source of sanitizer under an existing ON/OFF pump cycle.

16. The system according to claim 8, wherein the controllable source of sanitizer includes an apparatus for generating chlorine gas or sodium hypochlorite from a brine solution.

17. The system according to claim 8, further including a flow detector in contact with the flow of water and operably connected to the controller and wherein the controller prevents operation of the controllable source of sanitizer when a rate of the flow of water is below a predetermined amount.

* * * * *